(12) United States Patent
Pabla et al.

(10) Patent No.: US 8,337,996 B2
(45) Date of Patent: Dec. 25, 2012

(54) VANADIUM RESISTANT COATING SYSTEM

(75) Inventors: Surinder Singh Pabla, Greenville, SC (US); Vinod Kumar Pareek, Schenectady, NY (US); Suchismita Sanyal, Kamataka (IN); Krishnamurthy Anand, Kamataka (IN); Prajina Bhattacharya, Kamataka (IN)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 12/951,350

(22) Filed: Nov. 22, 2010

(65) Prior Publication Data
US 2012/0129000 A1 May 24, 2012

(51) Int. Cl.
*B21D 39/00* (2006.01)

(52) U.S. Cl. ............... 428/623; 416/241 B; 416/241 R; 428/701

(58) Field of Classification Search ............ 428/633, 428/335, 497, 469, 472, 585, 697, 698, 699, 428/701, 702, 623; 416/241 R, 241 B
See application file for complete search history.

(56) References Cited

U.S. PATENT DOCUMENTS

| | | | |
|---|---|---|---|
| 4,913,961 A | 4/1990 | Jones et al. | |
| 6,025,078 A * | 2/2000 | Rickerby et al. | 428/469 |
| 6,875,529 B1 | 4/2005 | Spitsberg et al. | |
| 6,887,595 B1 | 5/2005 | Darolia et al. | |
| 6,946,208 B2 | 9/2005 | Subramanian et al. | |
| 7,255,940 B2 | 8/2007 | Spitsberg et al. | |
| 2005/0036891 A1* | 2/2005 | Spitsberg et al. | 416/241 R |
| 2006/0151856 A1* | 7/2006 | Torigoe et al. | 257/632 |
| 2007/0281103 A1* | 12/2007 | Khan et al. | 427/456 |
| 2008/0220177 A1* | 9/2008 | Hass et al. | 427/446 |
| 2009/0176059 A1* | 7/2009 | Namba et al. | 428/155 |

FOREIGN PATENT DOCUMENTS

| | | |
|---|---|---|
| EP | 2009131 A1 | 12/2008 |
| EP | 2196559 A1 | 6/2010 |
| GB | 2080147 A | 2/1982 |

OTHER PUBLICATIONS

Sohn Y. H et al. "Degradation of Thermal Barrier Coatings by Fuel Impurities and CMAS", Proceedings of the International Thermal Spray Conference—Expanding Thermal Spray Performance to New Markets and Applications—Proceedings of the 2009 International Thermal Spray Conference, 1 page.

Tsai et al., "Hot Corrosion Behavior of Laser-glazed Plasma-sprayed Yttria-stabilized Zirconia Thermal Barrier Coatings in the Presence of V2O5", Surface and Coatings Technology, Elsevier, Amsterdam, vol. 201, 9-11, Jan. 31, 2007, pp. 5143-5147.

Chen Z et al., "Effect of Al2O3 Overlay on Hot-corrosion Behavior of Yttria-stabilized Zirconia Coating in Molten Sulfate-vanadate Salt", Thin Solid Films, Elsevier-Sequoia, S.A., Lausanne, CH, vol. 443, No. 1-2, Oct. 22, 2003, pp. 46-52.

* cited by examiner

*Primary Examiner* — Jennifer McNeil
*Assistant Examiner* — Daniel J Schleis
(74) *Attorney, Agent, or Firm* — McNees Wallace & Nurick LLC

(57) ABSTRACT

A vanadium resistant coating system resistant to high temperature vanadium attack. The system comprises a high temperature superalloy substrate. A bond coat overlies the superalloy substrate. The bond coat may be applied in multiple layers. A ceramic coating overlies the bond coat. The ceramic coating further comprises a zirconium oxide stabilized by at least one cation selected from the group consisting of $Yb^{3+}$, $Lu^{3+}$, $Sc^{3+}$ and $Ce^{4+}$, in the amounts of about 5-10 weight percent. An overcoat may overlie the ceramic coating. The overcoat may be a sacrificial layer of YSZ infiltrated with cations having an atomic radius larger than $Y^{3+}$. Alternatively, the overcoat may comprise zirconium oxide stabilized by $Ce^{4+}$.

19 Claims, 2 Drawing Sheets

VANADIUM RESISTANT COATING SYSTEM

FIELD OF THE INVENTION

The present invention is directed to a coating system having improved corrosion resistance when exposed to the by-products of the combustion of heavy fuel oil, and more specifically, to a coating system applied to superalloys used in high temperature applications exposed to attack by vanadium species from the combustion of heavy fuel oil.

BACKGROUND OF THE INVENTION

Yttria-stabilized zirconia (YSZ) is a well known material used to improve the performance of metals used in high temperature metals. The YSZ is applied, typically by a high temperature thermal spray coating process, as a thermal barrier coating (TBC). The TBC increases the operating temperature of the high temperature substrate metal. In addition, a bond coat is applied between the TBC and the high temperature metal to reduce the thermal mismatch between the TBC and the high temperature metal, which improves the spallation resistance of the TBC. This thermal barrier coating system includes the bond coat and the TBC. The bond coat typically is a MCrAlY, where M is a metal selected from the group consisting of Ni, Co, Fe and combinations thereof.

Thermal barrier coating systems are commonly used in the hot section of gas turbine engines to improve the temperature performance of high temperature substrate metals. These high temperature substrate metals are used for components such as combustors and turbine blades. The high temperature metals commonly are superalloy metals, and can be nickel based superalloy, cobalt based superalloys, iron based superalloys and combinations thereof. The TBC systems significantly increase the high temperature performance range of these superalloy metals.

Gas turbine engines can be operated using a number of different fuels. These fuels are combusted in the combustor section of the engine at temperatures at or in excess of 2000° F. (1093° C.), and the gases of combustion are used to rotate the turbine section of the engine, located aft of the combustor section of the engine. Power is generated by the rotating turbine section as energy is extracted from the hot gases of combustion. It is generally economically beneficial to operate the gas turbine engines using the most inexpensive fuel available. One of the more abundant and inexpensive petroleum fuels is heavy fuel oil (HFO). One of the reasons that HFO is an economical fuel is that it is not heavily refined. Not being heavily refined, it contains a number of impurities. One of these impurities is vanadium, which forms vanadium oxide ($V_2O_5$) at the high temperatures of combustion. Even though MgO is added as a fuel additive and acts as an inhibitor for reaction of vanadium species that forms an inert magnesium vanadate compound on or near the outer surface of the thermal barrier coating, MgO does not completely prevent the attack of YSZ thermal barrier coatings, as vanadium oxide can penetrate microcracks and porosity in the thermal barrier coatings, providing access not only to the YSZ thermal barrier coating, but also the underlying bond coat. $V_2O_5$ is an acidic oxide that can leach yttria from YSZ in cracks and porosity that occur in such thermal barrier coatings. The mechanism of attack is provided by the following reaction:

$$ZrO_2(Y_2O_3) + V_2O_5 \rightarrow ZrO_2 \text{ (monoclinic)} + 2YVO_4$$

Thus, $V_2O_5$ maintains the ability to rapidly attack YSZ, causing it to deteriorate and be removed by the hot gas stream. The loss of the TBC exposes the substrate metal and any remaining bond coat to the hot gases of combustion at elevated temperatures. At these elevated temperatures, the substrate metal and the bond coat is subject to corrosion from the hot gases of combustion, which shortens their life. As a result, the components such as combustors and turbine blades must be replaced in shorter intervals, which also means additional maintenance time for the turbine during which time it is not producing power.

A thermal barrier coating system that can be applied to hot gas path components in gas turbine engines that is not subject to attack by the hot gases of combustion is desirable in the art. In particular, the coating system should be resistant to attack by $V_2O_5$ that may be generated by HFO, while at the same time providing thermal protection to the substrate metal so that its life expectancy can be improved.

SUMMARY OF THE INVENTION

A vanadium resistant coating system resistant to high temperature vanadium attack is set forth. The system comprises a high temperature superalloy substrate. A bond coat overlies the superalloy substrate. The bond coat may be applied in multiple layers. A ceramic coating overlies the bond coat comprising a zirconium oxide stabilized by a cation of a rare earth element species having a smaller atomic radii than $Y^{3+}$. The rare earth element species having a smaller atomic radii than $Y^{3+}$ comprises about 5-10 weight percent of the ceramic coating.

In another embodiment, the vanadium resistant coating system comprises a high temperature superalloy substrate. A bond coat overlies the superalloy substrate. The bond coat may be applied in multiple layers up to a thickness of about 0.002-0.015". A first ceramic coating overlies the bond coat comprising a zirconium oxide stabilized by yttria. Yttria comprises about 2-20 weight percent of the ceramic coating and is applied to a thickness of 0.010-0.040". This coating, also referred to as YSZ inherently includes porosity and cracks. These cracks and porosities are infiltrated with cations of a rare earth species having a larger atomic radius than $Y^{3+}$ in the form of a solution. The solution of the cation forms an oxide of the species.

In a third embodiment, the vanadium resistant coating system comprises a high temperature superalloy substrate. A bond coat overlies the superalloy substrate. The bond coat may be applied in multiple layers up to a thickness of about 0.002-0.015". A first ceramic coating overlies the bond coat comprising a zirconium oxide stabilized by yttria. Yttria comprises about about 2-20 weight percent of the ceramic coating and is applied to a thickness of about 0.001-0.005". A second ceramic coating is applied overlying the first ceramic coating. The second ceramic coating comprise a zirconium oxide stabilized by cations of a rare earth species having a smaller atomic radius than $Y^{3+}$. The cations form an oxide of the species.

As used herein, the terms vanadium resistant coating and coatings resistant to vanadium attack refer to coatings that are resistant to attack of vanadium and its species, including but not limited to $V_2O_5$, particularly at elevated temperatures at which such species exist.

An advantage of the coating system set forth herein is that it is survivable in an environment that includes vanadium oxides, such as is generated when inexpensive fuel oils, such as heavy fuel oils are combusted.

Another advantage of the coating system set forth herein is that, in one form, zirconium oxide is stabilized with a species that is less susceptible to attack from vanadium oxides than yttria, and hence is more stable than YSZ.

An advantage of a different form of the present invention is that a layer of zirconium oxide is stabilized with a species that is more susceptible to attack from vanadium oxides than yttria. In this form, the layer acts as a sacrificial layer as the zirconium oxide preferentially attacks it rather than the YSZ.

Because the coating system set forth herein is less susceptible to attack and spallation from vanadium oxides from the combustion of inexpensive fuels such as heavy fuel oil, the life expectancy of the substrates to which this coating system is applied is extended, and the operating life of the turbine components that include such coated substrates is also extended, so that average length of time between shutdown for repairs is increased, and the overall down time for repairs is decreased.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

A coating system having improved resistance to attack from vanadium and its species in environmental conditions where such species of vanadium exist is set forth herein. Vanadium species, in particular $V_2O_5$, are by-products of the combustion of inexpensive fuels or petroleum products such as heavy fuel oil (HFO). $V_2O_5$ generated by the combustion of HFO attacks commonly used thermal barrier coatings such as YSZ. $V_2O_5$ is an acidic oxide that attacks the yttria in YSZ, thereby resulting in the breakdown of the YSZ and its destabilization. The $V_2O_5$ also attacks bond coats, such as MCrAlY, that are usually used to reduce stresses due to differential thermal expansion that exist between a ceramic thermal barrier coating and a metallic substrate. Once the MCrAlY is successfully attacked, the substrate itself is subject to corrosive attack by the vanadium species and other corrosive by-products that may be present in the combustion products of the fuel. The coating system set forth herein includes not only a ceramic coating that is resistant to attack by species of vanadium, and in particular $V_2O_5$, but also includes the bond coat applied over the substrate, to provide protection to the underlying metallic material from attack by the corrosive species, such as $V_2O_5$ when the ceramic thermal barrier coating has spalled or is no longer effective in preventing the corrosive species from penetrating through to the bond coat. The coating system may also provide thermal protection for the underlying substrate.

Figure 1:
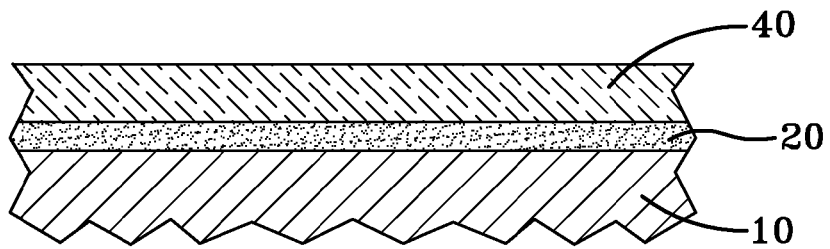
FIG. 1 discloses a first embodiment of a coating system having vanadium resistance that includes an bond coat overlying a substrate and a ceramic coating forming a top coat overlying the bond coat.

FIG. 1 represents a first embodiment of the coating system. In this embodiment, as in all embodiments described herein, the coating system includes a substrate 10. While the substrate may be any metallic material capable of operating at high temperatures at or in excess of about 2000° F. (1093° C.), these high temperature metallic materials usually are superalloys, including but not limited to Ni-based superalloys, Co-based superalloys, Fe-based superalloys and superalloys that include combinations of Ni, Fe and Co. These superalloys are capable of operating at extended periods of time at temperatures at or in excess of 2000° F. (1093° C.) when appropriate steps are taken to protect the superalloy substrates from corrosion and/or oxidation.

In this first embodiment, immediately overlying substrate 10 is a bond coat 20. Bond coat 20 may be a MCrAlY applied over the metallic substrate, where M is a metal selected from the group consisting of Ni, Co, Fe and combinations thereof, although other bond coats such as NiAl and PtAl and PtNiAl have been used. While bond coat 20 applied over substrate 10 may provide some protection from contact with corrosive species that may be present in the hot combustion gases, it principally assists in reducing stresses due to thermal mismatch that may be present at elevated temperatures due to the differential thermal expansion of metallic substrate 10 and any overlying ceramic coating. An MCrAlY bond coat includes aluminum. A thermally grown oxide (TGO) of aluminum forms on the surface of the bond coat when the bond coat is exposed to the hot combustion gases, which includes oxygen. The TGO, which experiences some growth with increasing time at operating temperatures, assists in alleviating stresses between any overlying ceramic coating and the substrate, thereby reducing a driver for spallation of the ceramic coating. The bond coat may be applied to a thickness of about 0.002-0.015 inches, although a preferred thickness is usually 0.002-0.012", or more preferably 0.010-0.012 inches. Functionally, the bond coat is relatively thin compared to the thickness of the substrate or the ceramic coating that overlies the bond coat.

In all embodiments described herein, bond coat 20 applied over substrate 10 alternatively also may be substantially pure platinum (Pt), substantially pure iridium (Ir), an alloy of iridium-hafnium (Ir—Hf), an alloy of iridium-platinum (Ir—Pt), or an alloy of platinum-rhodium (Pt—Rh). Of course the bond coat may include a layer of more than one of these materials, if desired. Thus, bond coat 20 be applied as two or more layers. It may include a layer of MCrAlY and a layer of precious metals or combination of precious metals as set forth above. When the bond coat includes one of these precious metals or combination of precious metals, it is impervious to attack by products of combustion, such as corrosive agents, including the vanadium species and in particular, $V_2O_5$. Although bond coat 20 that includes a precious metal or combination of precious metals is highly resistant to attack by $V_2O_5$, it is permeable to oxygen. Thus, if bond coat 20 comprises more than one layer, and the outer layer includes a precious metal or precious metal combination, oxygen can still diffuse through the outer layer so that a TGO can be grown on the surface of the inner layer of MCrAlY. The overall thickness of the multilayer bond coat lies at the thicker tolerance band of the 0.002-0.015 inch bond coat thickness, preferably about 0.010-0.012."

In the first embodiment, a ceramic coating 40 is applied over bond coat 20. Ceramic coating 40 includes a zirconium oxide stabilized by at least one cation selected from the group consisting of $Yb^{3+}$, $Lu^{3+}$, $Sc^{3+}$ and $Ce^{4+}$, in the amounts of 4-12 weight percent. Ceramic coating layer is applied in a thickness of from about 0.005-0.050", and preferably from about 0.007-0.040" The cations of each of these species have smaller atomic radii, and hence are more acidic than the $Y^{3+}$ that has traditionally been used to stabilize YSZ. Thus, $Yb^{3+}$, or any of the other cations in the group should provide a more resistant stabilizer for $ZrO_2$ than $Y^{3+}$, so that ceramic coating 40 should provide superior resistance to attack by $V_2O_5$ and provide a longer life than YSZ. Of the species set forth, $Yb^{3+}$ is the preferred stabilizer for $ZrO_2$. Of course, that $Yb^{3+}$, for example, is a more resistant stabilizer than $Y^{3+}$ for $ZrO_2$ in the presence of $V_2O_5$ can be shown by the free energy of formation. Referring to equation 1 below:

$$0.5 Y_2O_3 + 0.5 V_2O_5 = YVO_4 \quad (1)$$

has an enthalpy ΔH of −1.370 eV.
Referring to equation 2 below:

$$0.5 Yb_2O_3 + 0.5 V_2O_5 = YbVO_4 \quad (2)$$

has an enthalpy ΔH of −1.278 eV. Thus $YbVO_4$ is more difficult to form under the same conditions than is $YVO_4$, indicating that ytterbia formed from the $Yb^{3+}$ cation is a more effective stabilizer than yttria formed from the $Y^{3+}$ cation.

Figure 2:
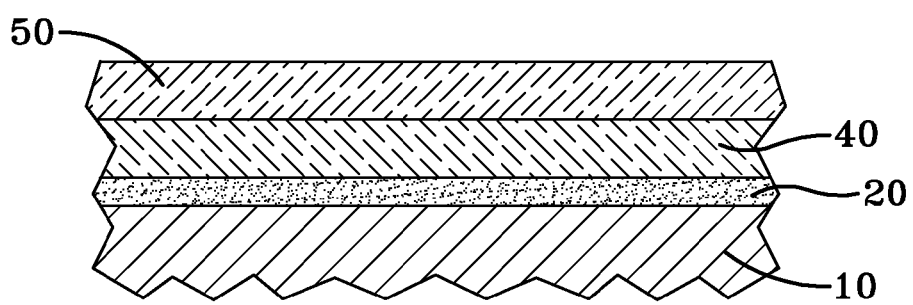
FIG. 2 discloses a second embodiment of coating system having vanadium resistance that includes a bond coat overlying a substrate, a ceramic coating overlying the bond coat and a sacrificial top coat overlying the ceramic coating.

A second embodiment of the coating system is set forth in FIG. 2. This second coating system differs from the coating system set forth in FIG. 1 in that it includes an additional ceramic top coat 50 overlying ceramic coating 40. Substrate 10, bond coat 20, and ceramic coating 40 are substantially identical to these features as described in the embodiment set forth in FIG. 1. Additional ceramic top coat 50 overlies ceramic coating 40 but differs from the ceramic coating in that it further comprises a YSZ layer stabilized by 2-20 weight percent yttria. Such a YSZ layer includes porosity and cracks, typically in the form of microcracks, as are usually found in ceramic coatings applied by well-known thermal spray processes. However this YSZ coating differs from well-known YSZ layers in that the layer further includes zirconia stabilized by about 5-10 weight percent of a rare earth species having a larger atomic radius that $Y^{3+}$. These rare earth species include a cation selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$ and $Ho^{3+}$, which are subsequently oxidized. These rare earth species oxides are preferentially attacked by the vanadium in the form of vanadium oxide, rather than the YSZ. Ultimately this layer will be depleted of the species oxide and the vanadium oxide will attack the YSZ resulting in the spallation, or loss, of this layer. This top coat, then, is a sacrificial layer. The top coat is applied to a thickness of about 0.001-0.005'. The overall thickness of ceramic coating 40 and top coat 50 overlying bond coat 20 is about 0.050" or less.

Sacrificial top coat 50 may be applied by one of two methods. As previously noted, YSZ usually include cracks and porosity, which are normally the result of the thermal spray process used to apply the coating, although the amount of porosity can be carefully controlled by the use of additional fugitive materials, as desired. The sacrificial layer is created by infiltrating the porosity in the YSZ layer with a solution of at least one cation of a species selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$ and $Ho^{3+}$. The species is then oxidized, forming an oxide with zirconia occupying the porosity and cracks of the YSZ. The species oxide is preferentially attacked by the vanadium in the form of vanadium oxide, rather than the YSZ. The rare earth species applied in this manner infiltrate the cracks and porosity to a depth of 0.0001-0.0005". Ultimately, the species oxide will be depleted and the vanadium oxide will attack the YSZ resulting in the spallation, or loss, of the sacrificial layer.

Sacrificial top coat 50 may also be applied over ceramic coating 40 by selecting powders of YSZ and zirconia stabilized by oxides formed by at least one cation of a species selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$ and $Ho^{3+}$. The ratio of powders of YSZ and lanthanum series (rare earth) stabilized species may vary as desired; however, a ratio of lanthanum series stabilized species powder of greater than about 30% is preferred. The powders are thoroughly mixed to achieve substantial uniformity and are codeposited by any of the well-known codeposition techniques. If desired, a graded composition can be achieved in top coat 50 by varying the amount of component powders (i.e. YSZ and lanthanum series stabilized species) as the powders are deposited. As used herein, substantial uniformity of mixing means that powders are thoroughly mixed to distribute them, although some localized regions may exist where one of the component powders is present in a somewhat higher or lower concentration than in other areas.

Figure 3:
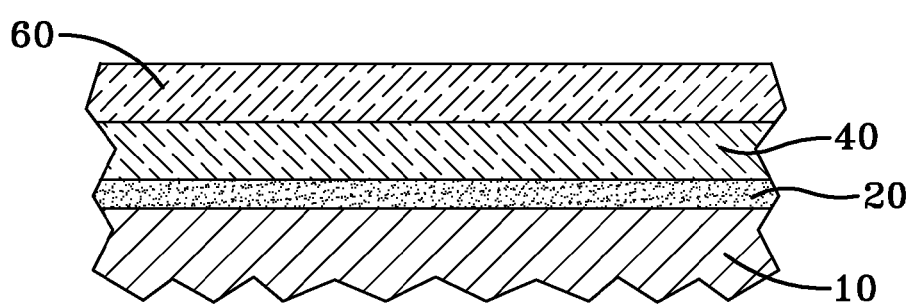
FIG. 3 discloses a third embodiment of coating system having vanadium resistance that includes a bond coat overlying a substrate, a ceramic coating overlying the bond barrier coating and a pyrochlore top coat overlying the ceramic coating.

A third embodiment of the coating system is set forth in FIG. 3. This third coating system differs from the coating system set forth in FIG. 2 in that it includes second ceramic coating 60 overlying first ceramic coating 40. Second ceramic layer 60 desirably is a pyrochlore composition or cerium stabilized zirconia (CSZ). Pyrochlores have a general formula of $A_2B_2O_7$, where A is a metal having a valence of $2^+$ or $3^+$, for example, gadolinium, aluminum, cerium, lanthanum or yttrium, and B is a metal having a valence of $4^+$ or $5^+$, for example, hafnium, titanium, cerium or zirconium, where the sum of the valences of the A and B metals is 7. However, ceramic coating 40 is then relied on to provide further protection for the system, and the sacrificial nature of second ceramic layer 60 will have served its purpose in delaying first ceramic layer 40 from full exposure to the vanadium species.

Spalling could occur due to a number of mechanisms, including corrosive attack of the ceramic overcoats 40, 50, and 60. In this circumstance, the layer of precious metal or combination of precious metals that may be included in bond coat 20 protects substrate 10 from exposure to species of vanadium, in particular $V_2O_5$. The precious metal or combination of precious metals in bond coat 20 also serve to protect the substrate from attack of $V_2O_5$ in the event that $V_2O_5$ vapors infiltrate and diffuse through available open porosity channels in the layers overlying bond coat 20. The layer of precious metal or combination of precious metals acts as a final obstacle to prevent $V_2O_5$ penetration.

Figure 4:
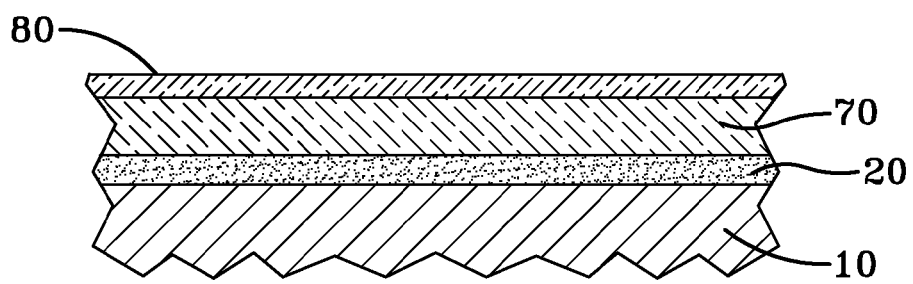
FIG. 4 discloses a fourth embodiment of coating system having vanadium resistance that includes a bond coat overlying a substrate, a YSZ ceramic coating overlying the bond coat, the YSZ ceramic coating having been infiltrated with a rare earth cation species that forms a thin topcoat.
Figure 7:
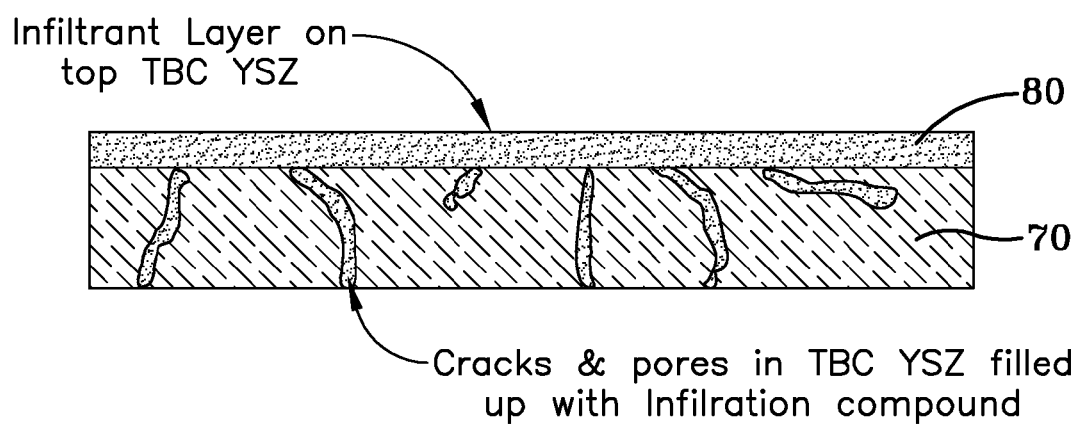
FIG. 7 is a magnified view of FIG. 4 showing rare earth species coating and infiltrant from rare earth species coating penetrating porosity and cracks open to the surface of the YSZ coating.

In another embodiment, depicted in FIG. 4, the first ceramic coating 70 overlying the bond coat is a standard layer of YSZ overlying the bond coat. First ceramic coating 70 comprises zirconium oxide stabilized by 2-20 weight percent yttria. First ceramic coating 70 is applied over the bond coat to a thickness of about 0.010-040". As previously noted porosity and cracks are inherent in YSZ applied by standard thermal spraying processes. The first ceramic coating 70 is then infiltrated with a solution of a cation of a rare earth species have a larger atomic radius than $Y^{3+}$ wherein the solution of the cation forms an oxide of the species. Preferably, the rare earth species is selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$ and $Ho^{3+}$. The rare earth species is infiltrated as a solution into the YSZ layer. The infiltrant forms a layer on the YSZ to a thickness of about 0.0001-0.0005" and will form stable oxides but will also penetrate into cracks and porosity in the surface of YSZ coating 70. Even when the cracks are tight, the infiltratrant may penetrate by capillary action. This pentration is into cracks and porosity of YSZ coating 70 is best shown in FIG. 7, which is a magnified view of the top two layers, 80, 70 of FIG. 5. The depth of infiltrant forms a mixed layer 80 comprising YSZ and zirconia stabilized by a lanthanum series (rare earth) stabilized species.

Figure 5:
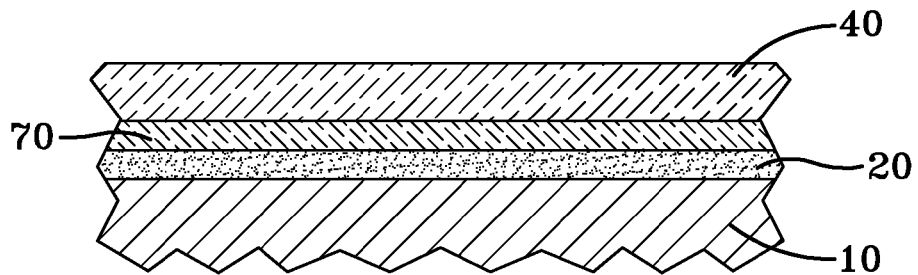
FIG. 5 discloses a fifth embodiment of coating system having vanadium resistance that includes a bond coat overlying a substrate, a first YSZ ceramic coating overlying the bond coat and a second ceramic coating overlying the first YSZ ceramic coating.

In yet another embodiment, depicted in FIG. 5, a vanadium resistant coating system resistant to high temperature vanadium attack, comprises a superalloy substrate 10 and a bond coat 20 overlying the superalloy substrate having a thickness of 0.002-0.015 inches, as previously described. A first ceramic coating 70 overlying bond coat 20 comprises zirconium oxide stabilized by 2-20 weight percent yttria. However, first ceramic coating 70 is applied over bond coat 20 as a relatively thin ceramic coating. This coating is applied to a thickness of about 0.001-0.005". A second ceramic coating 40 is applied over first ceramic coating 70. Second ceramic coating 40 comprises a zirconium oxide stabilized by a cation of a rare earth element species having a smaller atomic radii than $Y^{3+}$. This rare earth element species includes at least one cation selected from the group consisting of $Yb^{3+}$, $Lu^{3+}$, $Sc^{3+}$ and $Ce^{4+}$ in amount of about 5-10 weight percent. Second ceramic coating 40 may be applied to a thickness in the range of about 0.007-0.040".

Figure 6:
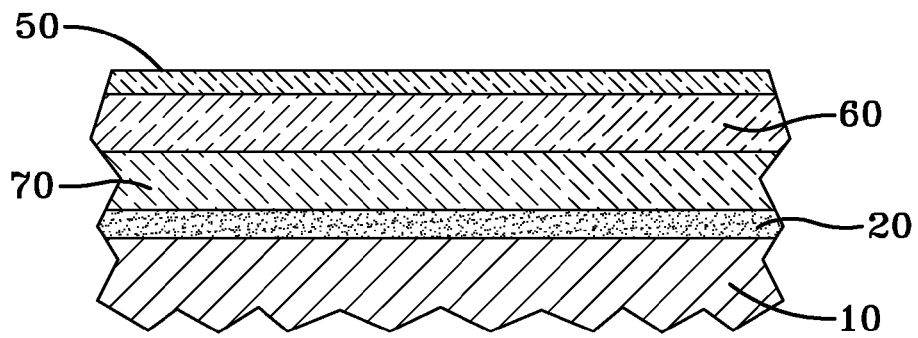
FIG. 6 discloses a sixth embodiment of coating system having vanadium resistance that includes a bond coat overlying a substrate, a first YSZ ceramic coating overlying the bond coat, a second ceramic coating overlying the first YSZ ceramic coating layer, the second ceramic coating having been infiltrated with a rare earth cation species.

A sixth embodiment of the invention is depicted in FIG. 6. As previously noted, porosity and cracks are inherent in thermally sprayed coatings. In this embodiment, second ceramic coating 40, which is the outermost ceramic coating in the system, is infiltrated with a solution of a cation of a rare earth species selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$ and $Ho^{3+}$, wherein the solution of the cation forms a zirconium oxide of the species. The cation of rare earth species is infiltrated as a solution into the second ceramic coating to a thickness of about 0.0001-0.0005". The depth of coating penetration is to form the mixed layer 50 is represented by a dashed line in FIG. 6. Because a zirconia stabilized by cation of a rare earth species selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$ and $Ho^{3+}$ is more susceptible to attack by the vanadium species in the products of combustions, zirconia stabilized by these lanthanum series elements will be preferentially attacked. MgO, added as a fuel additive, as previously noted, acts as an inhibitor for reaction of vanadium species that forms an inert magnesium vanadate compound on or near the outer surface and will act to help seal the porosity and cracks as the lanthanum series stabilized zirconia is sacrificed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vanadium resistant coating system resistant to high temperature vanadium attack, comprising:
    a superalloy substrate;
    a bond coat resistant to attack by corrosive by-products resulting from the combustion of fuels, the bond coat comprising a first layer of MCrAlY overlying the superalloy substrate, where M is a metal selected from the group consisting of Ni, Cr and Fe and combinations thereof, and a second layer overlying the first layer, the second layer comprising a precious metal;
    a ceramic coating overlying the bond coat, the ceramic coating further comprising a zirconium oxide stabilized by a cation of a rare earth element species having a smaller atomic radii than $Y^{3+}$, wherein the cation forms an oxide of the species; and wherein the cation has a lower enthalpy of formation with $V_2O_5$ than $Y^{3+}$; and
    a sacrificial ceramic oxide layer overlying the ceramic coating, the sacrificial ceramic oxide layer further comprising a zirconium oxide stabilized by yttria and a zirconium oxide stabilized by a cation of a rare earth species having a larger atomic radius than $Y^{3+}$, and wherein the cation forms an oxide of the species and can be attacked by $V_2O_5$ before the zirconium oxide stabilized by yttria.

2. The vanadium resistant coating system of claim 1 wherein the rare earth element species having a smaller atomic radius than $Y^{3+}$ includes at least one cation selected from the group consisting of $Yb^{3+}$, $Lu^{3+}$, $Sc^{3+}$ and $Ce^{4+}$.

3. The vanadium resistant coating of claim 1 wherein the rare earth element species in the amounts of 5-10 weight percent in the ceramic coating stabilizes zirconium oxide.

4. The vanadium resistant coating of claim 1 wherein the initial thickness of the sacrificial ceramic oxide layer overlying the ceramic coating is 0.007-0.040 inches.

5. The vanadium resistant coating system of claim 1 further comprising the sacrificial ceramic oxide layer comprising zirconia stabilized by yttria in amounts of 2-20 weight percent, and zirconia stabilized by the rare earth species having the larger atomic radius than $Y^{3+}$, in the amounts of 4-12 weight percent.

6. The vanadium resistant coating of claim 1 wherein the cation of the rare earth species having the atomic radius larger than $Y^+$ in the sacrificial ceramic oxide layer is selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$ and $Ho^{3+}$ and combinations thereof.

7. The vanadium resistant coating of claim 1 wherein the ceramic oxide layer comprising zirconia stabilized by yttria includes cracks and porosity open to the outer surface, the cracks and porosity infiltrated with the cation of a rare earth species having a larger atomic radius than $Y^{3+}$.

8. The vanadium resistant coating of claim 7 wherein the cracks and porosity are infiltrated to a depth of 0.0001-0.0005 inches below the outer surface with the cation of the rare earth species having an atomic radius larger than $Y^{3+}$.

9. The vanadium resistant coating of claim 1 wherein the sacrificial ceramic oxide layer comprises codeposited zirconia stabilized by yttria and zirconia stabilized by the cation of the rare earth species having the larger atomic radius than $Y^{3+}$.

10. The vanadium resistant coating of claim 9 wherein the codeposited sacrificial ceramic oxide layer comprises a uniform distribution of zirconia stabilized by yttria and zirconia stabilized by the cation of the rare earth species having a larger atomic radius than $Y^{3+}$.

11. The vanadium resistant coating of claim 9 wherein the codeposited sacrificial ceramic oxide layer comprises a graded distribution of zirconia stabilized by yttria and zirconia stabilized by the cation of the rare earth species having a larger atomic radius than $Y^{3+}$.

12. The vanadium resistant coating of claim 1 wherein the sacrificial ceramic oxide layer overlying the ceramic coating further comprises a composition selected from the group consisting of a pyrochlore composition and cerium stabilized zirconia.

13. The vanadium resistant coating of claim 12 wherein the pyrochlore composition has the formula $A_2B_2O_7$ where A is a metal having a valence of $2^+$ or $3^+$ and is selected from the group consisting of Al, Gd, Ce, La and combinations thereof.

14. The vanadium resistant coating of claim 12 wherein the pyrochlore composition has the formula $A_2B_2O_7$ where B is a metal having a valence of $4^+$ or $5+$ and is selected from the group consisting of Hf, Ti, Ce and combinations thereof.

15. The vanadium resistant coating system of claim 1 wherein the precious metal bond coat second layer further comprises at least one layer of precious metal selected from the group consisting of Pt, Ir, Ir-Hf, Ir-Pt and Pt-Rh and combinations thereof.

16. The vanadium resistant coating system of claim 15 wherein the overall thickness of the bond coat is about 0.002-0.015 inches.

17. The vanadium resistant coating system of claim 16 wherein the overall thickness of the bond coat is about 0.010-0.015 inches.

18. A vanadium resistant coating system resistant to high temperature vanadium attack, comprising:
   a superalloy substrate;
   a bond coat resistant to attack by corrosive by-products resulting from combustion of fuels, the bond coat comprising a first layer of MCrAlY overlying the superalloy substrate, where M is a metal selected from the group consisting of Ni, Cr and Fe and combinations thereof, and a second layer overlying the first layer, the second layer comprising a precious metal;
   a first ceramic coating overlying the bond coat, the first ceramic coating comprising zirconium oxide stabilized by 2-20 weight percent yttria, wherein the first ceramic coating is applied over the bond coat to a thickness of about 0.010-040inches; and
   a sacrificial ceramic oxide layer overlying the ceramic coating wherein the sacrificial ceramic oxide layer can be attacked by $V_2O_5$, wherein the sacrificial ceramic oxide layer comprises zirconia stabilized by yttria in the amounts of 2-20 weight percent, and zirconia stabilized by at least one cation of a rare earth species have a larger atomic radius than $Y^{3+}$, in the amounts of 4-12 weight percent, wherein the cation forms an oxide of the species and can be attacked by $V_2O_5$ before zirconia stabilized by yttria.

19. The vanadium resistant coating of claim 18 wherein the sacrificial ceramic oxide layer further includes an outer sealing surface comprising a magnesium vanadate compound.

* * * * *